Figure 1:
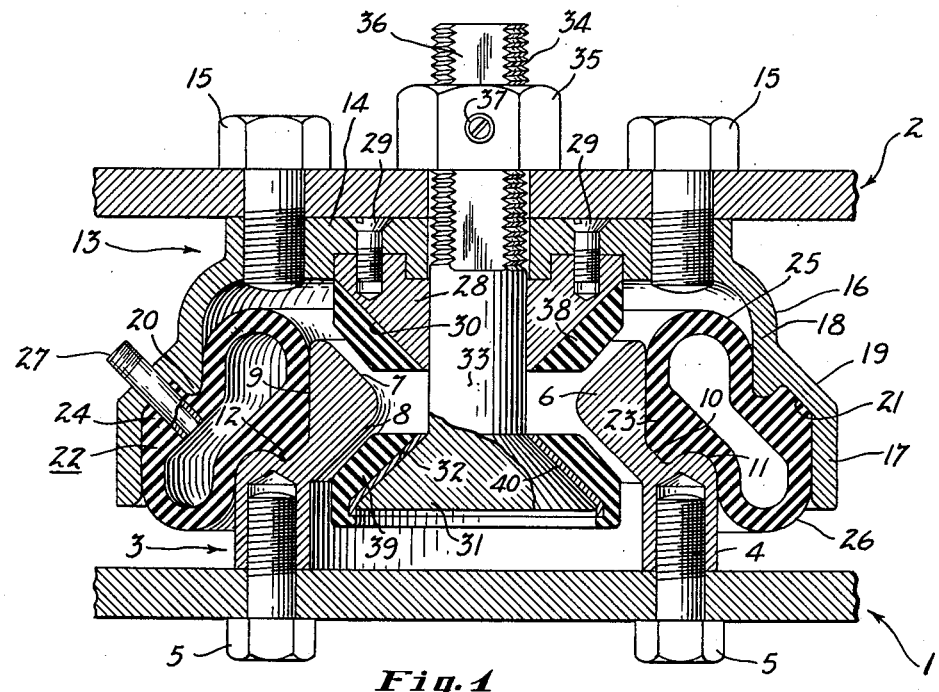

Nov. 14, 1961 C. O. SLEMMONS ET AL 3,008,703
VIBRATION ISOLATING AIR SPRING
Filed July 3, 1959

INVENTORS
Charles O. Slemmons
Glenn J. Haught
BY McCoy, Greene + LeGrotenhuis
ATTORNEYS

United States Patent Office 3,008,703
Patented Nov. 14, 1961

3,008,703
VIBRATION ISOLATING AIR SPRING
Charles O. Slemmons, Akron, and Glenn J. Haught, Cuyahoga Falls, Ohio, assignors to The General Tire & Rubber Company, Akron, Ohio, a corporation of Ohio
Filed July 3, 1959, Ser. No. 824,821
6 Claims. (Cl. 267—1)

This invention relates to vibration isolating air springs which provide yielding support for instruments or machines and that serve to prevent transmission of vibrations from a machine supported thereon to the fixed supporting structure on which it is mounted, or to prevent transmission of vibrations from the supporting structure to an instrument or machine mounted thereon.

The air spring of the present invention employs an elastic rubber inflatable annulus which may be inflated to various pressures to provide the desired deflection characteristics for the particular installation in which it is used and to provide substantially the same deflection characteristics for various loadings. The load is imposed axially upon the inflatable annulus which is so mounted between rigid annular connecting members, one secured to a fixed support and the other to a movable load carrying member, that the weight imposed upon one of the members is transmitted through the inflatable annulus to the other connecting member and the two members are yieldably held in coaxial relation.

The elastic inflatable annulus is an axially tapering air bag that is axially elongated in cross section and that has an air receiving cavity with edge portions of different diameters, the portions of the air bag wall that extend around the opposite edge portions of the air cavity being flexible. The air bag is confined between inner and outer coaxial annular connecting members which have bag engaging portions provided with axially facing oppositely disposed circumferential load carrying shoulders which, when said members are moved together, constrict portions of the air bag cavity intermediate the edge portions of different diameters and bag confining portions extending axially in opposite directions from the shoulders which limit the radial expansion of the opposite edge portions of the bag. The bag confining portions of the outer connecting member surround and are spaced radially outwardly of the bag confining portions of the inner member and the confined edge portions of the inflatable bag provide annular elastic cushions of different diameters with differential spring characteristics and differential damping action which cushion impact shocks and effectively absorb high frequency vibrations.

Upper and lower bumpers are provided which are secured in fixed positions with respect to one of the rigid connecting members and an intermediate bumper is secured in fixed position with respect to the other of the connecting members so that the relative axial movements of the connecting members in either direction are limited. The two axially spaced bumpers that are fixed to one of the connecting members are relatively adjustable axially to vary the range of deflection and rubber cushioning pads are preferably provided for cushioning impacts.

For any adjustment of the spaced bumpers the annulus may be subjected to an inflation pressure that centers the intermediate bumper with respect to the spaced bumpers so that a yielding support is provided which can be adjusted to provide substantially the same deflection characteristics for different loads within a relatively wide range.

Figure 2:
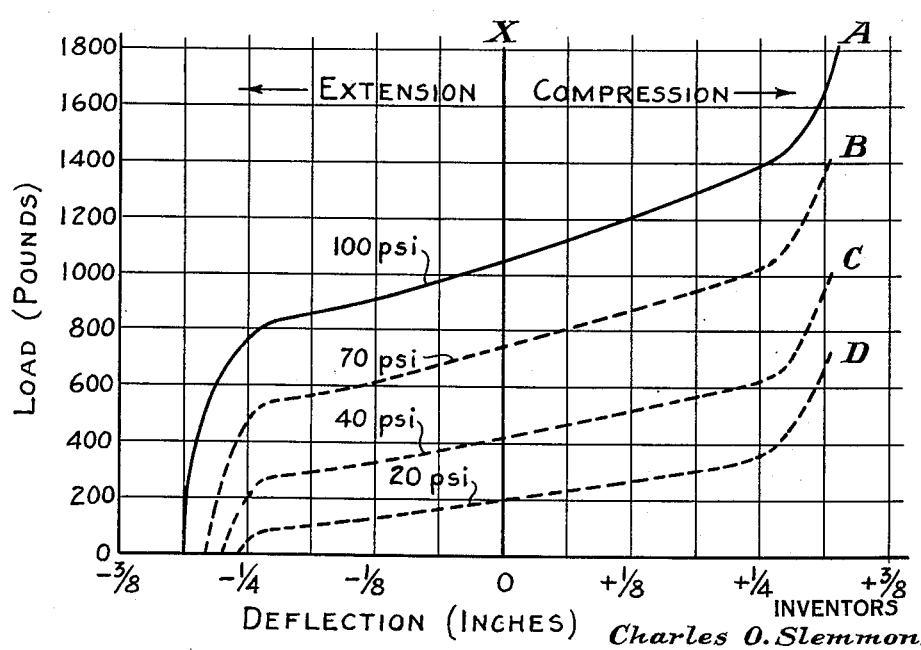

Reference should be had to the accompanying drawings forming part of this specification in which:

FIGURE 1 is a vertical axial section showing a vibration isolating air spring that embodies the present invention; and FIG. 2 is a chart indicating the deflection characteristics of the air spring under varying loads.

In the accompanying drawings the air spring of the present invention is shown interposed between a fixed support 1 and a load carrier 2 to provide yielding support for the carrier 2. A rigid annular connecting member 3 has a cylindrical lower portion 4 that is attached to the support 1 by means of suitable bolts 5. The connecting member 3 has an annular bumper 6 above and coaxial with the lower portion 4 that is of a diameter smaller than that of the lower portion 4 and the interior of the bumper 6 is formed to provide conical top and bottom impact faces 7 and 8. The bumper 6 has a cylindrical external face 9 and a short downwardly flaring conical face portion 10 which extends from the cylindrical face 9 to the upper end of the cylindrical portion 4. The upper end of the cylindrical portion 4 is formed to provide a convex annular shoulder 11 disposed outwardly of the face 10 and that forms with the face 10 an annular recess 12 inwardly of the shoulder 11.

An upper rigid connecting member 13 coaxial with the connecting member 3 has a flat top portion 14 that is rigidly secured to the carrier 2 by suitable means such as bolts 15. The upper connecting member 13 has a downwardly flaring annular flange 16 that is disposed coaxially with the lower connecting member 3 surrounding the same and spaced radially outwardly therefrom. The flange 16 has a cylindrical portion 17 at its lower end that surrounds the lower portion 4 of the connecting member 3 and a cylindrical portion 18 of smaller diameter than the cylindrical portion 17 that surrounds the cylindrical face 9 of the connecting member 3. The cylindrical portions 17 and 18 are connected by an upwardly tapering substantially conical connecting portion 19 and at the junction of the connecting portion 19 with the cylindrical portion 18 a downwardly facing shoulder is formed by an annular rib 20 which also forms the inner wall of an annular recess 21 between the rib 20 and the cylindrical portion 17.

An endless elastic inflatable rubber tube or air bag 22 is mounted in the annular space between the flange 16 and the connecting member 3, the air bag 22 being provided with thickened portions 23 and 24 in its interior and exterior walls that provide external positioning shoulders that are formed to fit in the shoulder recesses 12 and 21 of the connecting members. The air bag 22 has an upper flexible wall portion 25 that is received between the cylindrical face 9 of the connecting member 3 and the cylindrical portion 18 of the flange 16 of the connecting member 13 and a lower flexible wall portion 26 that is received between the lower cylindrical portion 17 of the flange 16 of the connecting member 13. The air bag 22 is provided with suitable means for introducing air under pressure such as a valve stem 27 carried by the portion 24 and extending through the flange 16. The air bag 22 when inflated provides a yielding support for the upper connecting member 13 and the carrier 2 and also serves to yieldingly hold the connecting members 3 and 13 in coaxial relation. By varying the pressure of the air within the air bag 22 the height at which the carrier 22 is supported above the support 1 may be adjusted as desired for any load that may be imposed upon the carrier 2.

The upper flexible wall portion 25 of the air bag forms an annulus of less diameter than the lower flexible wall portion 26 and extends around the upper portion of the air cavity which is of less diameter than the lower portion thereof that is enclosed by the lower flexible wall portion 26. The thickened portions 23 and 24 of the interior and exterior walls of the air bag provide circumferential positioning and thrust receiving shoulders which face axially downwardly and axially upwardly, respectively, which are engaged by the oppositely facing shoulders 11 and 20 of the connecting members 3 and 13 to improve the load on the air bag.

The flexible wall portion 25 is confined between the radially spaced portions 9 and 18 of the connecting members 3 and 13 which extend axially upwardly from the shoulders 11 and 20 and the flexible wall portion 26 is received between the portions 4 and 17 of the connecting members which extend axially downwardly from the shoulders 11 and 20. Upon downward movement of the connecting member 13 relative to the connecting member 3 the air cavity of the air bag is constricted intermediate the upper and lower flexible wall portions 25 and 26 of the bag so that the flexible wall portions 25 and 26 enclose upper and lower coaxial annular enlargements of the air cavity that are of different diameters and which provide elastic cushions that have differential spring characteristics and which have different damping action.

An annular bumper 28 is rigidly secured by any suitable means such as screws 29 to the under side of the top portion 14 of the connecting member 13. The bumper 28 is coaxial with the flange 16 and has a conical bottom face 30 that overlies the upper conical face 7 of the bumper 6 of the connecting member 4 and that has substantially the same taper as the face 7. A second bumper 31 coaxial with the bumper 28 is mounted in fixed position with respect to the upper connecting member 13 and is positioned below the bumper 28 and below the conical face 8 of the connecting member 3, the bumper 31 having a conical face 32 underlying the conical face 8 and having substantially the same angle of taper as the face 8. The bumper 31 is carried at the bottom end of a stem 33 that is axially positioned with respect to the connecting members 3 and 13 and that extends through the annular bumpers 6 and 28, the top portion 14 of the connecting member 13 and the carrier 2. The upper end of the stem 33 is provided with a screw thread 34 which receives a nut 35 that engages with the top of the carrier 2. The upper end of the stem 33 has flat faces 36 interrupting the nut receiving threads 34 with which a set screw 37 carried by the nut 35 may be engaged to lock the nut against rotation on the stem 33. By means of the nut 35 and the screw thread 34 the spacing of the bumpers 28 and 31 may be adjusted and by providing the proper inflation pressure in the tube 22 the connecting member 13 may be adjusted axially of the connecting member 3 to position the conical faces 7 and 8 of the bumper 6 with respect to the faces 30 and 32 of the bumpers 28 and 31. By providing the same adjustment of the connecting members for different loadings of the carrier 2 by varying the inflation pressure, substantially the same deflection characteristics may be provided for different loadings within a relatively wide range. The inflation pressure is usually that which will center the intermediate bumper 6 with respect to the spaced bumpers 28 and 31. With the connecting members so adjusted the air spring will have equal deflection upwardly or downwardly from the position in which the carrier is normally supported. Elastic rubber pads 38 and 39 are preferably provided on the bumpers 28 and 31 to cushion the impact between either of the spaced bumpers 28 and 31 with the intermediate bumper 6. The upper pad 38 is preferably permanently bonded to the bumper 28 and the lower pad 39 may be conveniently bonded to a conical sheet metal member 40 which is shaped to fit upon the conical face 32.

It will be apparent that the extent of relative axial movement of the connecting members 3 and 13 may be adjusted by adjusting the bumper 31 and that for any adjustment of the bumpers 28 and 31 the position of the bumpers 28 and 31 with respect to the intermediate bumper 6 may be adjusted by varying the inflation pressure of the tube 22.

The elastic rubber air tube 22 provides for maximum deflection axially of the tube but also provides universal cushioning and, by regulating the inflation pressure, substantially the same deflection characteristics may be provided for various loads within a relatively wide range.

In FIGURE 2 of the drawings a chart is shown in which the load in pounds is indicated along the vertical axis of coordinates and the deflection in inches is indicated along the horizontal axis of coordinates, deflections effecting axial compression of the air spring being indicated at the right of the vertical line X and deflections causing axial extension of the air spring being indicated at the left of the vertical line X. Curves A, B, C and D have been plotted to show the deflection characteristics of the spring at 100 p.s.i. inflation pressure, 70 p.s.i. inflation pressure, 40 p.s.i. inflation pressure and 20 p.s.i. inflation pressure respectively. The intersection of each of the curves A, B, C and D with the line X which represents zero deflection, indicates the load normally supported by the spring under the various inflation pressures.

As shown by the chart, the deflection characteristics of the spring at various inflation pressures is substantially uniform for all the pressures when the inflation pressures are adjusted to the various loads. The air spring has a low vibration frequency in an axial direction and provides an effective vibration isolator for a machine or instrument mounted on the carrier 2. It is to be understood that a single air spring may be used or a series of spaced air springs embodying the invention may be employed to support the carrier on which the machine or instrument is mounted.

It is to be understood that in accordance with the provisions of the patent statutes, variations and modifications of the specific devices herein shown and described may be made without departing from the spirit of the invention.

What we claim is:

1. A vibration isolating air spring comprising two rigid members each having upper and lower axially extending peripheral face portions of different diameters surrounding its axis, said members being disposed one within the other with their axially extending face portions radially spaced, said members having opposed radially extending axially spaced face portions providing a shoulder intermediate the upper and lower axially extending face portions of each, an inflatable elastic rubber annulus interposed between said rigid members, said annulus being axially elongated and having upper and lower flexible wall portions confined between said opposed radially spaced face portions of said members and thickened wall portions intermediate said upper and lower wall portions that provide annular shoulders for engagement with the shoulders of said rigid members, two axially spaced impact resisting bumpers both secured in fixed position with respect to one of said rigid members, and an intermediate impact resisting bumper secured in fixed position with respect to the other said coaxial members, said intermediate bumper being positioned between said axially spaced bumpers and engageable therewith to limit the relative axial movements of said coaxial members.

2. A vibration isolating air spring according to claim 1 in which said bumpers are annular and coaxial with the inflatable annulus and in which the bumpers are of smaller radius and disposed within the inflatable annulus.

3. A vibration isolating air spring according to claim 1 in which the rigid coaxial member having the peripheral face portion of smaller radius has an annular portion within its peripheral face portion that provides the intermediate bumper and that is formed to provide annular inwardly converging impact faces on axially opposite sides thereof and in which the other of the coaxial members is provided with a central portion extending axially through said annular portion and with annular bumpers surrounding said central portion and provided with annular impact faces opposed to the impact faces of said intermediate bumper.

4. A vibration isolating air spring according to claim 3 in which the impact faces of the spaced bumpers are provided with elastic rubber cushioning pads.

5. A vibration isolating air spring comprising two rigid members each having upper and lower annular face portions that extend axially, one of a diameter greater than the other, said members being disposed coaxially with the face portions of greater and lesser diameter of one of said members surrounding, opposed to and spaced radially from the corresponding face portions of the other, said members having opposed radially extending axially spaced face portions shaped to provide an annular axially facing shoulder intermediate the upper and lower axially extending face portions of each and an annular recess in each shoulder, and an inflatable annular elastic rubber air bag interposed between said rigid members, said air bag being axially elongated and having its opposite axially extending sides thickened to provide external radially extending axially facing annular thrust receiving and positioning shoulders engaging the said axially facing shoulders of said rigid members and shaped to fit in said recesses, said upper and lower flexible wall portions extending upwardly and downwardly from said positioning shoulders that are confined between said upper and lower axially extending face portions to provide coaxial annular upper and lower elastic cushions of different diameters.

6. A vibration isolating air spring according to claim 1 in which means is provided for adjusting one of the bumpers axially with respect to the others to center the intermediate bumper with respect to the other two bumpers.

References Cited in the file of this patent

UNITED STATES PATENTS

| | | |
|---|---|---|
| 1,003,579 | Bancroft | Sept. 19, 1911 |
| 1,475,049 | Church | Nov. 20, 1923 |
| 2,697,578 | Whittam | Dec. 21, 1954 |
| 2,716,566 | Thiry | Aug. 30, 1955 |
| 2,790,634 | Fawick | Apr. 30, 1957 |